US007967592B2

(12) United States Patent
Krämer

(10) Patent No.: US 7,967,592 B2
(45) Date of Patent: Jun. 28, 2011

(54) ROTARY TABLET PRESS WITH WASHING DEVICE AND ROTOR FOR IT

(75) Inventor: Hans Krämer, Cologne (DE)

(73) Assignee: Ima Kilian GmbH & Co. KG, Köln (DE)

( * ) Notice: Subject to any disclaimer, the term of this patent is extended or adjusted under 35 U.S.C. 154(b) by 94 days.

(21) Appl. No.: 12/300,444

(22) PCT Filed: May 2, 2007

(86) PCT No.: PCT/EP2007/003853
§ 371 (c)(1),
(2), (4) Date: May 13, 2009

(87) PCT Pub. No.: WO2007/131632
PCT Pub. Date: Nov. 22, 2007

(65) Prior Publication Data

US 2010/0003361 A1 Jan. 7, 2010

(30) Foreign Application Priority Data

May 11, 2006 (DE) ..................... 20 2006 007 629 U

(51) Int. Cl.
*B29C 43/08* (2006.01)

(52) U.S. Cl. .. 425/225; 425/226; 425/345; 425/DIG. 47

(58) Field of Classification Search .......... 425/225–229, 425/345, DIG. 47; 264/39
See application file for complete search history.

(56) References Cited

U.S. PATENT DOCUMENTS 6,676,863 B2 * 1/2004 Christiaens et al. ............ 264/39
6,997,691 B2 * 2/2006 Trebbi et al. .................. 425/345
7,381,356 B2 * 6/2008 Shimada et al. ................ 264/39
7,637,728 B2 * 12/2009 Roemer et al. ................ 425/345
2003/0015840 A1 1/2003 Davis

FOREIGN PATENT DOCUMENTS

| | | | |
|---|---|---|---|
| DE | 203 04 981 | U1 | 9/2004 |
| FR | 2 558 901 | | 1/1985 |
| GB | 2 046 169 | A | 11/1980 |
| JP | 62097799 | | 7/1987 |
| JP | 10060502 | | 3/1998 |
| WO | WO 02/064356 | A1 | 8/2002 |
| WO | WO 02/074528 | A1 | 9/2002 |
| WO | WO 03/020499 | A1 | 3/2003 |

OTHER PUBLICATIONS

International Search Report for International Application No. PCT/US2007/003853.

* cited by examiner

*Primary Examiner* — Robert B Davis
*Assistant Examiner* — Thu Khanh T Nguyen
(74) *Attorney, Agent, or Firm* — Rankin, Hill & Clark LLP

(57) ABSTRACT

The invention relates to a rotary table press with washing device and to a rotor for it, said rotor being provided at least with a bottom-punch guide ring (11) having guides (12) for bottom punches and with a die plate (17) arranged between the punch guide rings, wherein at least one sealing element (26) interacting with the associated punch is provided for the bottom punches. In order to improve the use of an automatic washing device, a leakage passage (30) for draining off the washing liquid is formed according to the invention in the bottom-punch guide ring for each bottom punch guide. The leakage passages are preferably to perform their draining function only when leakages are occur unnoticed at individual sealing elements of the bottom punch guides.

19 Claims, 2 Drawing Sheets

ROTARY TABLET PRESS WITH WASHING DEVICE AND ROTOR FOR IT

CLAIM OF PRIORITY

This application claims priority from International Application PCT/EP2007/003853 filed on May 2, 2007 which is hereby incorporated by reference herein in its entirety and which forms a part of the specification of this application.

BACKGROUND

The disclosure relates to a rotor for a rotary tablet press with a washing device, with an upper-punch guide ring having guides for upper punches, with a lower-punch guide ring having guides for lower punches, and with a die plate arranged between the punch guide rings, wherein at least one sealing element which interacts with the associated punch can be fastened or is fastened in or to the guides for the upper and lower punches. The disclosure furthermore also relates to a rotary tablet press with a housing, with a rotor which is arranged in a drivable manner in the housing and has an upper-punch guide ring with guides for upper punches, a lower-punch guide ring with guides for lower punches and a die plate arranged between the punch guide rings, and is provided with sealing elements assigned to the upper and lower punches, and with a washing device with which the rotor can be washed or can be cleaned by means of washing liquid.

Rotary tablet presses having upper and lower punches, which are guided in associated punch guide rings and with which tablets, in particular made of powder, such as tablets for medicaments, washing-agent tablets or the like can be produced in the dies of a die plate, have long been known. The rotor which is driven by means of a suitable motor can have, for example, up to 60 pressing stations and can revolve at speeds of, for example, up to 150 rpm depending on the size and diameter of the punch guide rings and die plate. The upper and lower punches here are moved up and down by means of suitable rollers or slotted guide tracks in order to undertake the production of the tablets in the dies. In order to protect the guides for the punches, which guides are generally designed as sliding guides, from the entry of dust from the tablets, the upper and lower punches are assigned sealing elements which can be designed as expansion bellows, as disclosed, for example in WO 02/064 356 A1, or as sealing collars with stripping lips, as disclosed in WO 03/084 738 A1.

In the case of more recent generations of rotary tablet presses, use is made of washing devices which are integrated therein and with which the rotor and also the entire working interior in which the rotor is located during operational use can be cleaned with washing liquid. The integration of automatic washing devices permits short conversion times to a different tablet geometry while maintaining high operational reliability. The washing liquid is sprayed into the working space at a pressure of, for example, up to 6 bar via nozzles, and the surfaces of the punches, and the dies and/or receptacles for the dies are cleaned with the washing liquid under pressure. Since all of the parts coming into contact with the product to be produced are cleaned with the washing liquid, contamination of a subsequent batch can be prevented and at the same time the risk to personnel from dust from the tablets, the dust being detrimental to health, is avoided. However, in the case of rotary tablet presses with a washing device, there is the risk that the washing liquid will also penetrate into the sliding guides for the punches, as a result of which, under some circumstances, costly work to reclean the rotary tablet press may be necessary.

It is the object of the disclosure to improve a rotary tablet press and the associated rotor structurally for the use of an automatic washing device.

This and further objects are achieved according to the disclosure with the rotor and the rotary tablet press in that a leakage passage for discharging the washing liquid is formed for each lower-punch guide in the lower-punch guide ring. The leakage passages are preferably intended only to carry out their discharging function whenever leakages occur unnoticed at individual sealing elements of the lower-punch guides. Owing to the leakage passages provided according to the disclosure, even leakages of individual sealing elements do not then lead to damage to the guides in the lower-punch guide ring and/or to contamination of an oil or machine sump with washing liquid, such as in particular water.

SUMMARY OF THE DISCLOSURE

In the preferred embodiment of the disclosure, the leakage passages comprise bores which run obliquely with respect to the center axis of the associated guide in the lower-punch guide ring. The angle of inclination of the leakage passages can be, for example, 30° C. to 60° C. and preferably in the region of 45° C., in order to readily and rapidly discharge any washing liquid which enters in the event of leakages of the associated sealing element.

In one aspect of the disclosure, the respective leakage passages can open into a circumferential groove formed on the outer circumference of the lower-punch guide ring such that the washing liquid can be transferred by means of the centrifugal forces during rotation of the rotor to the outside into the circumferential groove and can be conducted away further from there. The circumferential groove can be designed such that it runs around preferably with a constant cross section in order to avoid imbalances in the lower-punch guide ring and at the same time to achieve specific conducting away of washing liquid which may have accumulated in the circumferential groove. It is particularly advantageous if the circumferential groove obtains a cross section which forms the circumferential groove in the form of a water drip and which ensures that washing liquid can be discharged downward and outward to the lower side of the lower-punch guide ring. For this purpose, the circumferential groove can have in particular a curved lower side, and/or the opening points of the leakage passages in the circumferential groove are located further outward radially relative to the axis of rotation of the rotor than the inside of the groove.

In this case, the curvature preferably also extends beyond the inner side of the groove into a rectilinear, upper groove flank surrounding the opening orifice of the leakage passages. As an alternative, all of the leakage passages can also extend as far as a concentrically encircling, preferably vertically oriented outer or circumferential wall of the lower-punch guide ring. For this purpose, each leakage passage can advantageously have a dedicated opening orifice on the outer wall. It is particularly expedient if, at the transition of the circumferential wall or outer wall to its lower side, the lower-punch guide ring has a concentrically encircling drip edge or the like which preferably projects partially over the lower side and with which a liquid film emerging from the leakage passages can be prevented from being able to move in the direction of the axis of rotation despite the rotation of the rotor.

In accordance with another aspect of the disclosure, a sealing ring seat for a preferably additional sealing ring, at the height of which or above which the associated leakage passage opens with its upper opening orifice into the associated guide, is formed in each guide in the lower-punch guide ring. If leakages possibly occur in the sealing elements assigned to the punch guides, said additional sealing ring, which may comprise, for example, an O ring or the like and bears in a sealing manner against the stem of the lower punches, prevents a washing liquid which enters through a nontight sealing element from being able to enter the guides to a relatively great depth and from being able to contaminate sliding means located there or from being able to reduce the sliding action thereof. At the same time, the interaction of the additional sealing ring with the leakage passage ensures that the washing liquid does not accumulate above the sealing ring but rather is conducted away via the leakage passage. For this purpose, the sealing ring seat is expediently formed below a fastening means for the sealing element, and/or the sealing element can in particular comprise an expansion bellows seal. However, all of the interchangeable sealing elements may also comprise seals having stripping lips bearing against the punch stems.

A sealing collar can furthermore preferably be fastened to the outer circumference of the lower-punch guide ring. The sealing collar can in particular have a sealing lip which, in the installed state or operating state of the rotor, bears in a sealing manner against the housing or against a bottom trough of the rotary tablet press and forms a dynamic seal during the rotation of the rotor. It is particularly advantageous if the sealing collar and/or the sealing lip extend axially downward beyond the opening points of the leakage passages.

The above object is also achieved for a rotary tablet press by means of the disclosure by means of the leakage passages formed for each lower-punch guide in the lower-punch guide ring. In order to improve a rotary tablet press according to the disclosure with a washing device with regard to its operational reliability, a collecting line via which the washing liquid discharged by the leakage passages can be supplied to a collecting container or an outflow can furthermore preferably be formed in the housing. It is particularly advantageous if the collecting line and/or the collecting container are/is assigned a sensor for detecting the entry of washing liquid. Consequently, with the corresponding sensor, it can be determined within a very short amount of time during the washing or cleaning phase whether all of the sealing elements for the lower-punch guides in the lower-punch guide ring and/or the sealing collar forming the dynamic seal have leakages. In addition, the washing phase can be switched off temporarily and automatically if the entry of washing liquid is detected. A rotary tablet press with a washing device and a sensor which detects entry of washing liquid into one of the leakage passages or the collecting line permits an extremely operationally reliable procedure for cleaning a rotary tablet press by the washing operation being switched off if entry of washing liquid is detected by the sensor. The provision of a single sensor is sufficient if the collecting line is formed at the bottom of an annular passage which is arranged in the housing below the lower-punch guide ring and the dynamic seal. It is particularly favorable if the annular passage runs or is designed such that it drops toward the collecting line.

It is furthermore particularly advantageous if a working space which is sealed in a liquid-tight manner and which can be filled with washing liquid for submerging the rotor into a washing bath is formed in the housing. The flooding of the working space with the washing liquid, such as, for example, water, has the advantage that the sealing elements which surround the punch stems are wetted on all sides with the washing liquid and has the latter rinsing around it. The submerging operation causes in particular those sections of the sealing elements which face the axis of rotation of the rotor to be wetted and rinsed around with washing liquid. If the working space is flooded, a procedure is advantageous in particular in which the entire rotor, including die plate, upper punches and sealing elements on the upper punches and, if appropriate, the lower side of the upper-punch guide ring, which side faces the working space, have the washing bath rinsing around them, with the rotor at the same time being set into rotation at an, if appropriate, high rotational speed in the working position in order, by means of the rotational movement, to generate a rinsing flow in the washing bath, the rinsing flow cleaning off all of the parts of the rotor and working space which come into contact with the material which is to be pressed. The submerging of the rotor in the working position, if appropriate with rotation of the rotor, is of independent importance.

Still other aspects of the disclosure will become apparent to those skilled in the art upon a reading and understanding of the following detailed description.

DESCRIPTION OF THE DRAWINGS

The disclosure may take form in certain parts and arrangement of parts, embodiments of which will be described in the specification and illustrated in the accompanying drawings which form a part hereof and wherein.

DETAILED DESCRIPTION OF THE DISCLOSURE

Figure 1:
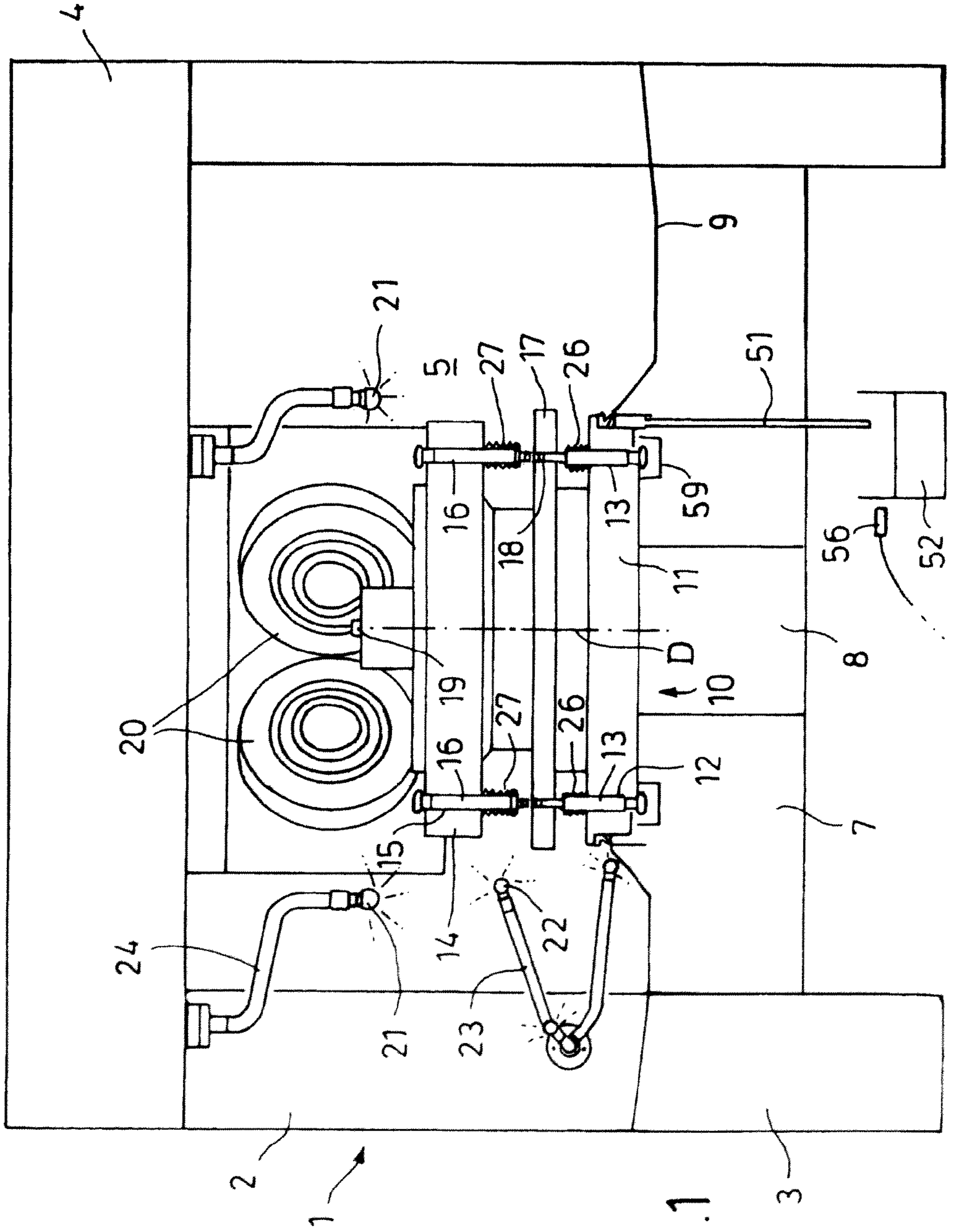
FIG. 1 shows, in schematic form, a rotary tablet press with a rotor according to the disclosure and washing device.

Referring to the drawings wherein the showings are for purposes of illustrating embodiments of the disclosure only, and not for purposes of limiting same;

FIG. 1 shows a rotary tablet press in accordance with an embodiment of the disclosure, which is illustrated in a simplified manner schematically, and is denoted overall by the reference number 1. The rotary tablet press 1 for producing, for example, tablets for medicaments has a housing 2, a base structure 3, an upper covering 4 and a bottom trough 9, with which a working space 5, in which a rotor denoted overall by 10 is arranged, is enclosed in a liquid-tight and/or dust-tight manner. For access to the working region, the housing 2 has at least one openable and closable door opening through which the rotor 10 can be changed or, if appropriate, removed. At the same times the base structure 3 supports a bottom trough 7, at or on which, inter alia, a motor 8 (not illustrated in detail) for driving the rotor 10 of the rotary tablet press 1 is arranged.

The rotor 10 comprises, in a manner generally known, a lower-punch guide ring 11 with numerous sliding guides 12, which preferably comprise guide bores, for lower punches 13 which are arranged concentrically around the axis of rotation D of the rotor 10 and are movable vertically, an upper-punch guide ring 14 with sliding guides 15, which in turn comprise bores, for upper punches 16 which are vertically movable and are arranged concentrically around the axis of rotation D, and a die plate 17 which is arranged between the upper-punch guide ring 14 and the lower-punch guide ring 11 and has dies 18 which are arranged corresponding to the number of upper punches 16 and lower punches 13 and are aligned therewith or with the guides 13, 15 thereof. The desired tablets (not illustrated) can be produced in the dies by compressing powder which is supplied in a suitable manner. In the exemplary embodiment shown, the upper-punch guide ring 14, the lower-punch guide ring 11 and the die plate 17 are designed as separate components. Individual or a plurality of said individual elements could also be formed integrally. The die plate or the dies could also be composed of a plurality of segments. In the exemplary embodiment shown, the individual elements of the rotor 10 are held together by means of a fastening screw 19 (merely indicated) which is preferably arranged on the axis of rotation D.

For the vertical movement of the lower punches 13 which are guided by their stems in the guides 12, a slotted guide track 59 is formed below the lower-punch guide ring 11, with which slotted guide track, in a manner known per se, the head ends of the lower punches 13 are guided in a sliding manner and are moved up and down. In the exemplary embodiment shown, the upper head ends of the upper punches 16 are moved up and down in the associated guides 15 by means of rollers 20 in order, during operational use, to compress the tablets in the dies 18 and, at the end of the compression operation, to eject them upward or downward out of the dies 18.

The rotary tablet press 1 is furthermore provided with a washing device of which only the washing nozzles 21 and 22 projecting into the working space 5, together with associated supply lines 23, 24 are illustrated in FIG. 1. In the exemplary embodiment shown, a suitable washing liquid, such as, in particular, water, is supplied to the nozzles 21 via the upper covering 4 and to the nozzles 22 via the vertical struts of the housing 2, and the working space 5 is designed that it is downwardly sealed by means of the trough 9 in order, in a washing cycle, to clean those elements of the rotor 10 which are arranged in the working space 5 during operational use and in the operating position and also the housing walls with the washing liquid which, for this purpose, emerges from the nozzles 21, 22 at a pressure of, for example, 6 bar and a maximum throughput of, for example, 300 liters/min while the rotor 10 rotates while the housing is closed. In this case, the expansion bellows seals 26, which are assigned to the lower-punch guides 12 and are fastened in the guides 12 or around the guides 12 in the lower-punch guide ring 11, and the expansion bellows 27, which are assigned to the guides 15 of the upper punches 16, prevent, during the washing mode, the washing agent liquid from being able to enter the sliding guides 12 and 15. Expansion bellows seals 26, 27 are also assigned to the punch guides 12 and 15 in the case of conventional rotary tablet presses in order, during the normal operation of the rotor 10, when tablets are compressed in the dies 18 by the upper and lower punches 16, 13 to prevent dust or powder from entering the sliding guides. The expansion bellows seals 26, 27 are interchanged either after predetermined maintenance intervals or in the event of visible damage to the sealing elements (expansion bellows (26, 27)).

Figure 2:
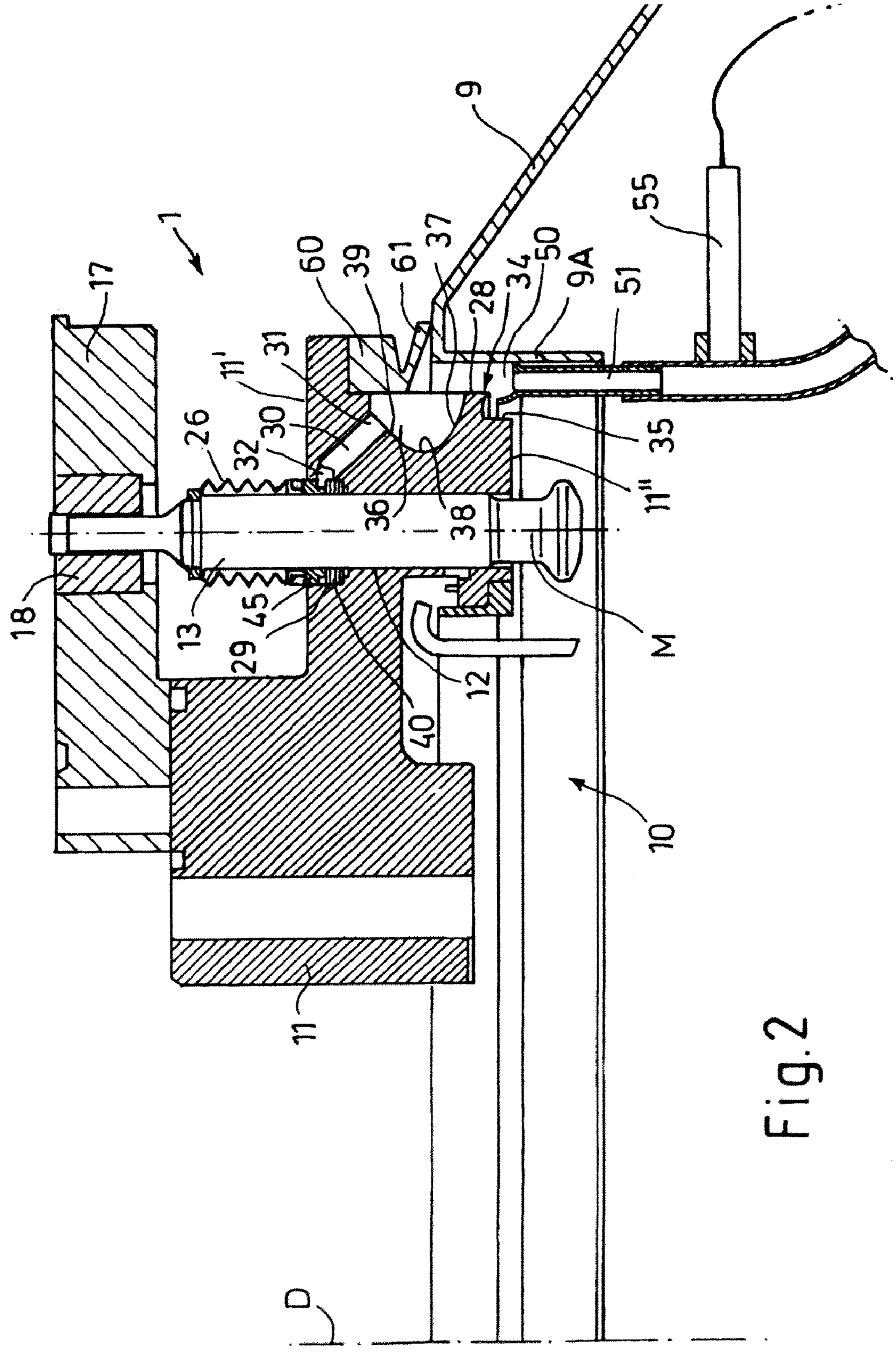
FIG. 2 shows, in a sectional view, a partial cutout of a rotary tablet press with lower-punch guide ring and die plate.

According to the disclosure, a leakage passage 30 is now assigned to each guide 12 for the lower punches 13 in the lower-punch guide ring 11, as is apparent from the enlarged detailed view of a partial cutout of the rotary tablet press 1 in FIG. 2. FIG. 2 illustrates, in this case in a sectional illustration, a partial section of the lower-punch guide ring 11 and a partial section of the die plate 17 together with a section of the trough 9, with a multiplicity of identical arrangements of punch guides 12, lower punches 13, dies 18 and leakage passages 30 and associated upper punches being distributed over the circumference of the rotary tablet press 1 and of the lower-punch guide ring 11 and die plate 17.

Each leakage passage 30 runs obliquely, inclined toward by an angle of 45° relative to the center axis M of the guides 12 for the lower punches 13, in the exemplary embodiment shown, and opens into a circumferential groove 36 on the outer circumference 28 of the lower-punch guide ring 11. The circumferential groove 36 is preferably designed such that it runs around with a constant cross section and has a curved lower side 37, a likewise curved inside 38 and an upper flank 39 which rises obliquely upward and surrounds the opening point 31 of the leakage passage 30 into the circumferential groove 36. The opening point 31 lies significantly further outward radially than the inside 38 of the circumferential groove 36. The upper opening point 32 of the leakage passage 30 opens into the associated guide bore 12 for the lower punches 13 essentially level with a sealing ring seat 29 for a sealing ring 40 which is arranged at the bottom of a blind hole (recessed step) of the guide bore 12, which blind extends from the upper side 11' of the lower-punch guide ring 11 and is designed concentrically with respect to the guide 12. In this case, the sealing ring 40, which bears in a sealing manner against the circumferential surface of the stem of the lower punches 13, sits below a fastening ring 45 onto which the expansion bellow seals 26 for the lower punches 13 and lower-punch guides 12 can be releasably clipped.

The leakage passages 30 come into operation exclusively in the washing mode and only if the associated expansion bellows seal 26 has a leakage point in the expansion bellows and/or with respect to the lower fastening ring 45. This is because only in this case does a small or relatively large amount of washing agent liquid enter the upper region of the blind hole of the guide 12 where it can drain away as far as the additional sealing ring 40. However, owing to the leakage passage 30 which opens above the sealing ring 40, the washing agent liquid entering there, assisted by the rotational forces during rotation of the rotor 10, is then discharged via the associated leakage passage 30 into the circumferential groove 36 which, owing to its geometry, forms a water drip such that a quantity of liquid accumulating in the circumferential groove 36 is transferred downward into an annular passage 50 formed in an encircling manner below the lower-punch guide ring 11. A connecting line 51 preferably adjoins the lowermost point of the annular passage in order to supply the washing agent liquid conducted away via the leakage passages 30 to a collecting container 52 (shown schematically in FIG. 1).

In the exemplary embodiment illustrated in FIG. 2, the collecting line 51 is assigned a sensor 55 with which any entry of liquid into the collecting line 51 is detected in order to indicate to the operating personnel, for example via the signal from the sensor 55, that there has to be a leakage at at least one expansion bellows seal 26 for the lower punches 13. In the event of entry of a relatively large amount of liquid, the washing cycle can also be automatically interrupted immediately. As an alternative, as indicated in the exemplary embodiment in FIG. 1, the collecting container 52 can also be assigned a sensor 56 in order to detect entry of liquid into the collecting container 52 therewith.

As can be readily seen in particular in FIG. 2, the collecting line 51 is preferably arranged in alignment with and below the outside 28 of the lower-punch guide ring 11, with the annular passage 50 extending as far as a vertical wall section 9A of the trough 9. At the same time, a sealing collar 60 is fastened in an encircling manner to the lower-punch guide ring 11 above the circumferential groove 36, said sealing collar extending downward over the lower opening point 31 of the leakage passage 30 and comprising a sealing lip 61 which, during rotation of the rotor 10, rests in a sealing manner on the trough 9 as a dynamic seal in order to prevent liquid from the working space 5 from being able to enter the machine sump 7 or the motor 8. Since the annular passage 50 and the collecting line 51 are located directly below the sealing point between the sealing lip 61 and the trough 9, the sensors 55 and 56 can also be used at the same time to detect a leakage in said sealing collar 60 such that the potential risk of a leakage in said dynamic sealing collar 60 is also minimized. The possibility of detecting leakages in the dynamic seal is of independent inventive importance even if, for example, there were no leakage passages in the lower-punch guide ring.

In order to improve the dripping or draining away of the washing liquid, which emerges from the leakage passages 30 in the event of leakages of the sealing elements 26, by the circumferential wall which is oriented vertically and lies parallel to the axis of rotation, a concentrically encircling drip edge 34 is formed at the transition of the circumferential wall 28 into the lower side 11" of the lower-punch guide ring 11, which drip edge projects over the lower side of an encircling step 35 around the lower-punch guide ring preferably as a sharp edge. The drip edge prevents liquid from being able to move to the lower side 11" of the lower-punch guide ring 11 and therefore from being able to enter, if appropriate from below, into the sliding guides 12, if appropriate lubricated with an oil film, for the lower punches.

For a person skilled in the art, numerous modifications which will be included in the range of protection of the appended claims, emerge from the preceding description. It is evident to a person skilled in the art that the number of working stations or pressing stations within the die plate and punch-guide rings does not matter. It furthermore goes without saying that a plurality of conducting passages could have common opening points and, instead of an encircling circumferential groove, a respective water drip for each individual conducting passage could be formed on the outer circumference, or the circumferential groove could also be entirely omitted. Owing to the narrow fit between the punches and the associated guides, the additional sealing ring can also be omitted. The sensor or plurality of sensors could also be positioned at different locations. Instead of expansion bellows seals, other sealing elements could also be assigned to the punches.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A rotor for a rotary tablet press with a washing device, said rotor comprising: an upper-punch guide ring having guides for upper punches, a lower-punch guide ring having guides for lower punches, and a die plate arranged between the punch guide rings, wherein at least one sealing element which interacts with the associated punch is fastened to the guides for the upper and lower punches, wherein a leakage passage for discharging washing liquid is formed in the lower-punch guide ring for each lower-punch guide.

2. The rotor as claimed in claim 1, wherein the leakage passages comprise bores which run obliquely with respect to the center axis of the guides.

3. The rotor as claimed in claim 1, wherein the leakage passages open into a circumferential groove which is formed on the outer circumference of the lower-punch guide ring and form a water drip.

4. The rotor as claimed in claim 3, wherein the circumferential groove has a curved lower side.

5. The rotor as claimed in claim 4, wherein the lower opening points of the leakage passages into the circumferential groove are located further outward radially than the inside of the groove, and the inside of the groove has a curved profile.

6. The rotor as claimed in claim 5, wherein the leakage passages extend as far as a concentrically encircling outer wall of the lower-punch guide ring.

7. The rotor as claimed in claim 6, wherein, at the transition to the lower side, the outer wall of the lower-punch guide ring is provided with a concentrically encircling drip edge.

8. The rotor as claimed in claim 7, wherein a sealing ring seat for an additional sealing ring, at the height of which or above which the associated leakage passage opens into the guide, is formed in each guide in the lower-punch guide ring.

9. The rotor as claimed in claim 8, wherein the sealing ring seat is formed below a fastening means for the sealing element.

10. The rotor as claimed in claim 9, wherein the sealing element comprises an expansion bellows seal or a sealing lip seal.

11. The rotor as claimed in claim 10, wherein a sealing collar is fastened to the outer circumference of the lower-punch guide ring.

12. The rotor as claimed in claim 11, wherein the sealing collar has a sealing lip which, in the installed state of the rotor, bears in a sealing manner against the housing or against the trough of the rotary tablet press.

13. The rotor as claimed in claim 12, wherein the sealing collar and the sealing lip extend axially downward beyond the opening points of the leakage passages into the circumferential groove.

14. A rotary tablet press with a housing, and a rotor which is arranged in a drivable manner in the housing and has an upper-punch guide ring with guides for upper punches, a lower-punch guide ring with guides for upper punches, a lower-punch guide ring with guides for lower punches and a die plate arranged between the punch guide rings, and is provided with sealing elements fastened to the guides and assigned to the upper and lower punches, and with a washing device with which the rotor can be washed by means of washing liquid, wherein a leakage passage for discharging the washing liquid in the event of leakages of the sealing elements of the lower-punch guides is formed for each lower-punch guide in the lower-punch guide ring.

15. The rotary tablet press as claimed in claim 14 wherein a collecting line via which the washing liquid discharged from the leakage passages is supplied to a collecting container and outflow is formed in the housing.

16. The rotary tablet press as claimed in claim 15, wherein the collecting line or the collecting container is assigned a sensor for detecting entry of washing liquid.

17. The rotary tablet press as claimed in claim 16, wherein the collecting line is formed at the bottom of an annular passage which is formed in the housing below the lower-punch guide ring or below a sealing collar fastened to said collecting line.

18. The rotary tablet press as claimed in claim 17, wherein the annular passage is designed such that it drops toward the collecting line.

19. The rotary tablet press as claimed in claim 18, wherein a working space is sealed in a liquid-tight manner and is filled with washing liquid for flooding and submerging the rotor in a washing bath is formed in the housing.

* * * * *